United States Patent
Fatehi et al.

(10) Patent No.: US 10,936,318 B2
(45) Date of Patent: Mar. 2, 2021

(54) TAGGED INDIRECT BRANCH PREDICTOR (TIP)

(71) Applicant: International Business Machines Corporation, Armonk, NY (US)

(72) Inventors: Ehsan Fatehi, Austin, TX (US); Naga Gorti, Austin, TX (US); Nicholas Orzol, Austin, TX (US); Christian Zoellin, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/190,309

(22) Filed: Nov. 14, 2018

(65) Prior Publication Data

US 2020/0150968 A1  May 14, 2020

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3842* (2013.01); *G06F 9/3848* (2013.01)

(58) Field of Classification Search
None
See application file for complete search history.

(56) References Cited

U.S. PATENT DOCUMENTS

| | | | |
|---|---|---|---|
| 5,724,563 A * | 3/1998 | Hasegawa | G06F 9/3804 712/233 |
| 6,823,446 B1 | 11/2004 | Sinharoy | |
| 7,673,122 B1 | 3/2010 | Song et al. | |
| 9,021,240 B2 * | 4/2015 | Alexander | G06F 9/3804 712/239 |
| 9,229,723 B2 * | 1/2016 | Bonanno | G06F 9/3806 |
| 9,239,721 B2 * | 1/2016 | Bonanno | G06F 9/3806 |
| 9,311,100 B2 * | 4/2016 | Gupta | G06F 9/3806 |
| 9,442,736 B2 * | 9/2016 | Eickemeyer | G06F 9/3844 |
| 9,471,314 B1 | 10/2016 | Bonanno et al. | |
| 9,483,271 B2 * | 11/2016 | Karkhanis | G06F 9/322 |
| 10,261,798 B2 | 4/2019 | Manoukian | |
| 10,423,422 B2 * | 9/2019 | Soundararajan | G06F 9/38 |
| 10,481,914 B2 * | 11/2019 | Bolbenes | G06F 9/3844 |
| 10,607,137 B2 * | 3/2020 | Sadasivam | G06N 3/08 |
| 10,691,460 B2 * | 6/2020 | Bonanno | G06F 12/0875 |
| 2004/0210749 A1 * | 10/2004 | Biles | G06F 9/3848 712/240 |
| 2007/0083739 A1 | 4/2007 | Glew | |

(Continued)

*Primary Examiner* — Steven G Snyder
(74) *Attorney, Agent, or Firm* — Cantor Colburn LLP; Bryan Bortnick

(57) ABSTRACT

A computer system includes a first predictor circuit configured to generate a first predictor signal, and a second predictor circuit configured to generate a second predictor signal different from the first predictor signal. The computer system further includes a TIP arbiter configured to receive the first predictor signal and the second predictor signal, and to select one of the first predictor signal or the second predictor signal as a final prediction of a target address for a fetched branch instruction. The selection is based at least in part on a comparison between a branch address of the fetched branch instruction and a stored tag value, along with a counter value stored in the arbiter entry.

18 Claims, 5 Drawing Sheets

(56) References Cited

U.S. PATENT DOCUMENTS

| | | | |
|---|---|---|---|
| 2009/0217015 A1* | 8/2009 | Alexander | G06F 9/3842 |
| | | | 712/239 |
| 2011/0078425 A1* | 3/2011 | Shah | G06F 9/3806 |
| | | | 712/239 |
| 2011/0093658 A1 | 4/2011 | Zuraski, Jr. et al. | |
| 2011/0289300 A1 | 11/2011 | Beaumont-Smith et al. | |
| 2013/0332715 A1* | 12/2013 | Bonanno | G06F 9/3806 |
| | | | 712/240 |
| 2014/0082339 A1* | 3/2014 | Bonanno | G06F 9/3806 |
| | | | 712/240 |
| 2014/0195789 A1* | 7/2014 | Gupta | G06F 9/3806 |
| | | | 712/239 |
| 2014/0258696 A1* | 9/2014 | Srikantaiah | G06F 9/30058 |
| | | | 712/239 |
| 2015/0046690 A1* | 2/2015 | Eickemeyer | G06F 9/3844 |
| | | | 712/239 |
| 2015/0186145 A1* | 7/2015 | Karkhanis | G06F 9/3806 |
| | | | 712/238 |
| 2017/0139717 A1* | 5/2017 | Hornung | G06F 9/30058 |
| 2017/0315810 A1 | 11/2017 | Eickemeyer et al. | |
| 2018/0173533 A1* | 6/2018 | Soundararajan | G06F 9/3848 |
| 2019/0138315 A1* | 5/2019 | Bolbenes | G06F 9/3844 |
| 2019/0303160 A1* | 10/2019 | Greenhalgh | G06F 9/3806 |
| 2019/0384609 A1 | 12/2019 | McLellan et al. | |

\* cited by examiner

… (1)

TAGGED INDIRECT BRANCH PREDICTOR (TIP)

BACKGROUND

The present invention relates to computing systems, and more particularly, to branch prediction schemes employed in computing systems.

Indirect branch prediction provides performance improvements to many programs. A known system contains three tables for indirect branch prediction. These tables are also referred to as count caches (for "branch to count instruction"). They include a local count cache indexed by instruction address storing predicted targets, a global count cache indexed by a combination of instruction address and global history vector storing predicted values of taken or not outcomes for previous branch instructions, and a selector table (sometimes referred to as a count cache arbiter) that decides which of the two tables (local or global) provides the prediction. A local selector may be incorporated in the local count cache, while a global selector may be embedded in the global count cache. Generally, prediction based on a previous target can be performed by combining the previous target with the effective address (EA) and global history vector (GHV) hash. The traditional GHV is essentially a history of a number of taken/not taken branch results. Accordingly, the traditional GHV could indicate, for example, that a process is currently operating in the initialization code, at line 1,020 of a C-language file. Conventional systems use this information to guess where the current process is at in the source, and in turn, predict the next jump.

SUMMARY

According to a non-limiting embodiment, a computer system includes a first predictor circuit configured to generate a first predictor signal, and a second predictor circuit configured to generate a second predictor signal different from the first predictor signal. The computer system further includes a TIP arbiter configured to receive the first predictor signal and the second predictor signal, and to select one of the first predictor signal or the second predictor signal as a final prediction of a target address for a fetched branch instruction. The selection is based at least in part on a comparison between a branch address of the fetched branch instruction and a stored tag value, along with a counter value stored in the arbiter entry.

According to another non-limiting embodiment, a method is provided to perform tagged indirect branch predictions. The method comprises generating, via a first predictor circuit, a first predictor signal, and generating, via a second predictor circuit, a second predictor signal different from the first predictor signal. The method further comprises selecting, via a TIP arbiter, one of the first predictor signal or the second predictor signal as a final prediction of a target address for a fetched branch instruction. The selecting is based at least in part on a comparison between a branch address of the fetched branch instruction and a stored tag value, along with a counter value stored in the arbiter entry.

According to yet another non-limiting embodiment, a computer program product comprises a computer readable storage medium having program instructions embodied therewith. The program instructions are executable by a computer processor to cause the computer processor to perform a method of performing tagged indirect branch predictions. The method comprises generating, via a first predictor circuit, a first predictor signal, and generating, via a second predictor circuit, a second predictor signal different from the first predictor signal. The method further comprises selecting, via a TIP arbiter, one of the first predictor signal or the second predictor signal as a final prediction of a target address for a fetched branch instruction. The selecting is based at least in part on a comparison between a branch address of the fetched branch instruction and a stored tag value, along with a counter value stored in the arbiter entry.

Additional features and advantages are realized through various teachings and non-limiting embodiments described herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
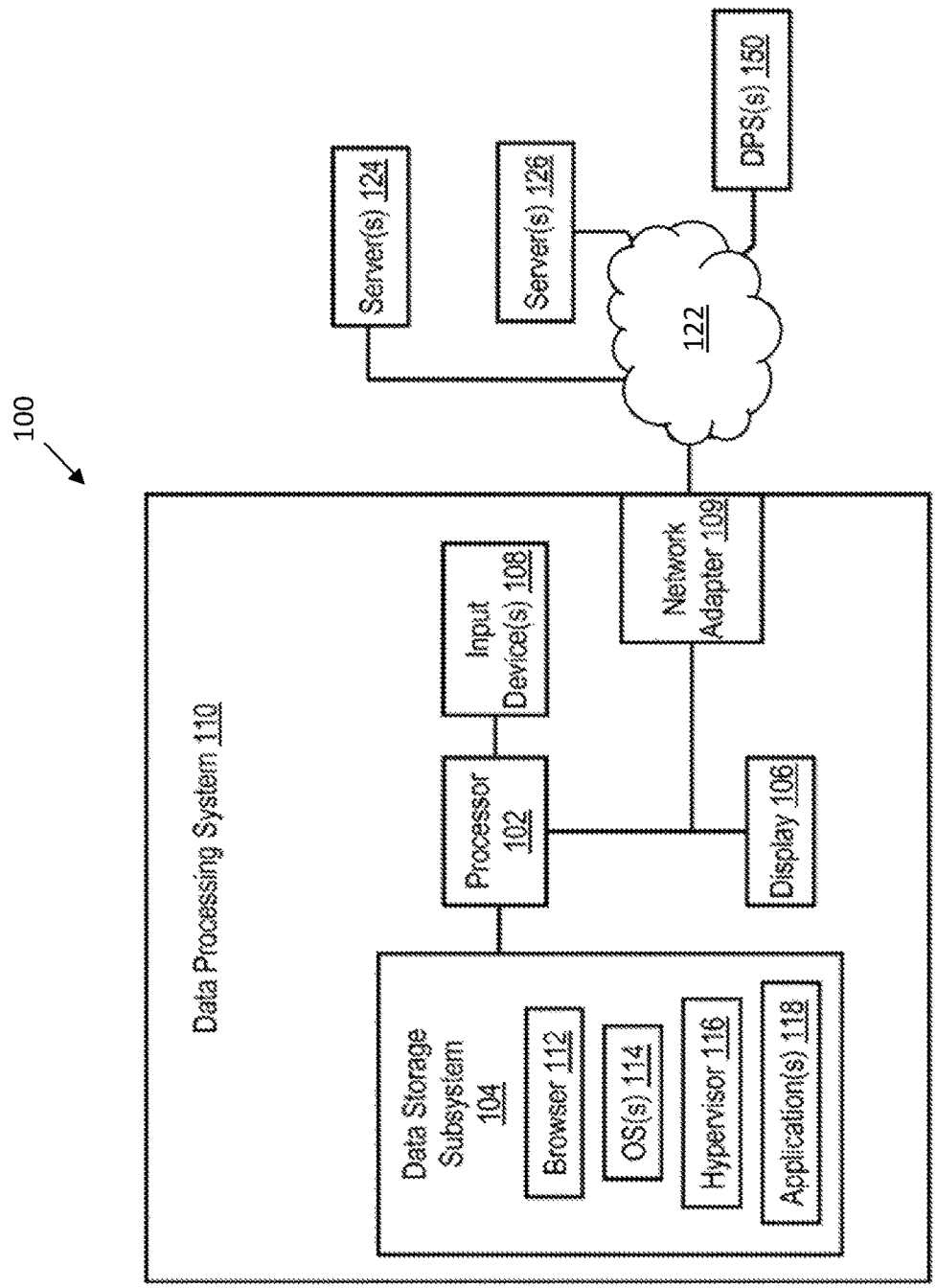
FIG. 1 is a block diagram illustrating a computer system capable of performing tagged indirect branch predictions according to a non-limiting embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to a description of technologies that are more relevant to the inventive teachings, combining a previous target with an effective address (EA) and global history vector (GHV) hash to perform indirect branch predictions has been found to degrade prediction accuracy in some cases, for the same number of entries as compared to count cache, and may require a large number of entries for equivalent accuracy. One strategy for counteracting the degraded accuracy is to implement a third count cache that is indexed with a hash of previous seen target addresses. This strategy, however, requires a separate selector circuit to choose between local, global, and "previous target" count caches, which increases the time to make the correct selection without fully guaranteeing improved prediction accuracy.

Furthermore, recent performance data shows that indirect branch prediction is still important for programming languages. For example, indirect branch prediction serves as interpreters of various scripting languages such as, for example, Python. However, conventional indirect branch prediction schemes have proven to be inadequate for these predictions because only global history vectors are used.

Various non-limiting embodiments herein provide a computing system that improves performance, power consumption, and programming language processing by using a newly added arbiter unit to select between a traditional predictor and a newly employed predictor that is provided with different information from the traditional predictor. The newly employed predictor predicts a target address of one or more branch instructions based at least in part on the target effective addresses (EA) of a history of recent jump targets, rather than a history of a previous history of taken/not taken branches.

The inventive teachings described herein improves the accuracy of the target predictors, thereby leading to significant performance improvements and substantial power saving gains. The improved target predictions can be achieved using a new prediction scheme that employs a "tagged indirect predictor" (TIP) unit that operates in conjunction with a TIP arbiter unit.

In at least one non-limiting embodiment, the TIP arbiter can select the winner among the combination of the rest of the target predictors and a TIP predictor generated by the TIP unit. The TIP arbiter will be tagged based on bits from the instruction address, where decrementing and incrementing of the TIP arbiter is allowed when a tag constructed from the address of an executed branch matches with the entry stored in the TIP, i.e., when instruction address bits from the current branch match the tagged bits in the TIP arbiter. For example 0xFFFF00F is looked up in the TIP, and its tag is using some of its instruction address bits 0xF00F. The system will look up 0xF00F in the current index of the TIP arbiter, and if a match of the tag is detected, the system will use the address destination in the TIP. Accordingly, the entry is used when an index "hit" in the TIP is detected and the tag is matched. Otherwise, the entry is not used.

To enable timely replacement of entries in the TIP, at least one non-limiting embodiment employs a confidence mechanism. The confidence of the prediction in the TIP arbiter is incremented and decremented according to accuracy irrespective of the tagging in the TIP arbiter. Whenever the TIP is found to have supplied the correct target for a branch instruction, which is known when the branch instruction executes, the confidence is incremented, saturating at a maximum value. If it is found that the TIP supplied a wrong target, the confidence is decremented instead until it reaches 0. When the confidence goes to 0 and the alternate predictors incorrectly predict a branch, then the corresponding entry is replaced with a different entry (i.e., different target prediction) intended to improve confidence and accuracy. In other words, the target address is replaced when the confidence falls below a threshold value and the alternate predictors are incorrect. This operation ensures that the system remains current within the execution context and selectively utilizes the TIP when necessary, thereby reducing interference and de-aliasing branches.

With reference now to FIG. 1, a computing system 100 includes a data processing system 110 capable of performing tagged indirect branch predictions is illustrated according to a non-limiting embodiment. Data processing system 110 may take various forms, such as workstations, laptop computer systems, notebook computer systems, desktop computer systems or servers and/or clusters thereof. Data processing system 110 includes one or more processors 102 (which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 also includes application programs, such as a browser 112 and a hypervisor 116. The browser 112 may optionally include customized plug-ins to support various client applications. The hypervisor 116, sometimes referred to as a virtual machine monitor (VMM)), manages one or more virtual machines (VMs) as instantiated by different OS images. The application program can also include other applications 118 including, but not limited to, a word processing application, a presentation application, and an email application.

The display 106 may be, for example, a cathode ray tube (CRT) or a liquid crystal display (LCD). Input device(s) 108 of data processing system 110 may include, for example, a mouse, a keyboard, haptic devices, and/or a touchscreen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Computing system 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
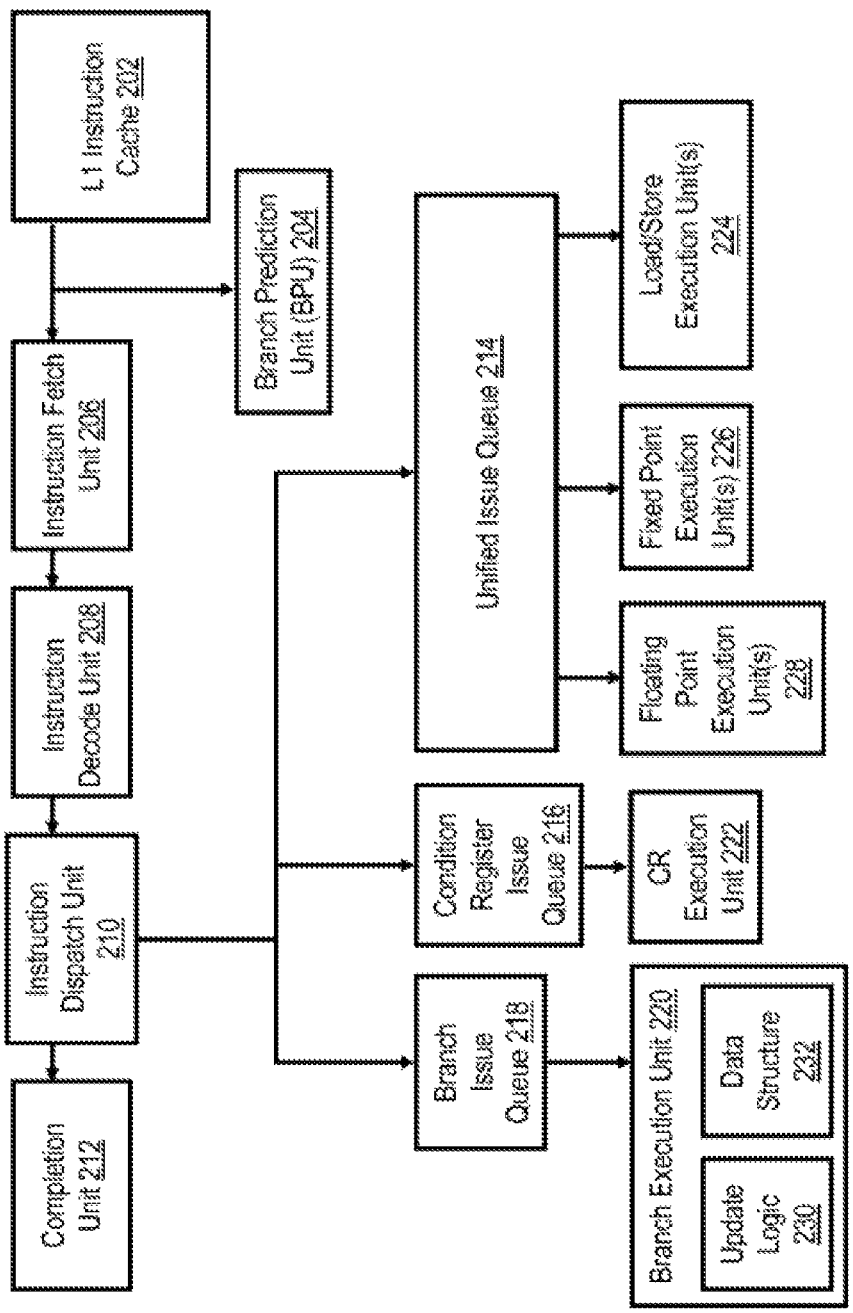
FIG. 2 is a diagram of a computer processor pipeline of the data processing system of FIG. 1 according to a non-limiting embodiment.

Turning to FIG. 2, a hardware computer processor 102 included in the data processing system 110 is illustrated according to a non-limiting embodiment. The processor 102 includes a level 1 (L1) instruction cache 202 from which instruction fetch unit (IFU) 206 fetches instructions. IFU 206 may support a multi-cycle (e.g., three-cycle) branch scan loop to facilitate scanning a fetched instruction group for branch instructions predicted 'taken', computing targets of the predicted 'taken' branches, and determining if a branch instruction is an unconditional branch or a 'taken' branch. Fetched instructions are also provided to branch prediction unit (BPU) 204, which predicts whether a branch is 'taken' or 'not taken' and a target of predicted 'taken' branches.

In one or more embodiments, BPU 204 includes a branch direction predictor that implements a local branch history table (LBHT) array, global branch history table (GBHT) array, and a global selection (GSEL) array. The LBHT, GBHT, and GSEL arrays (not shown) provide branch direction predictions for all instructions in a fetch group (that may include up to eight instructions). The LBHT, GBHT, and GSEL arrays are shared by all threads. The LBHT array may be directly indexed by bits (e.g., ten bits) from an instruction fetch address provided by an instruction address (iaddr) such as an instruction fetch address register (IFAR). The GBHT and GSEL arrays may be indexed by the instruction fetch address hashed with a global history vector (GHV).

The GHV is a 20-bit vector that tracks a "taken/not taken" history of a previous number of branches (e.g., the last 20 branches). In at least one non-limiting embodiment, "1" bit is shifted into the GHV for every taken branch while a "0" bit is shifted into the GHV for every instruction group. For example, a traditional GHV for the last 20 branches could be: "10101011110001110011". In at least one embodiment, the hash of a given GHV value is used as an index into the GBHT. Accordingly, the GBHT can be used to indicate that based on when the last time the binary bit represented by the hash was detected, whether the next branch was either taken or not taken.

Unlike conventional systems, the data processing system 110 implements an additional new optimized GHV (i.e., $GHV_{iaddr}$). The new optimized $GHV_{iaddr}$ is utilized to generate a separate prediction, which is used in part to determine the final prediction. Unlike the traditional GHV, the optimized $GHV_{iaddr}$ is based on target addresses for recently executed indirect branches. In at least one non-limiting embodiment, the $GHV_{iaddr}$ is based on the target effective addresses (EA) of recent jump targets, rather than a history of a previous number of taken/not taken branches. For example, if the recent three indirect branches jumped to the following instruction addresses: 0xFFF4; 0XFFBD; 0XFF90, the resulting $GHV_{iaddr}$ hash would appear as 0xF4BD90. In this manner, the $GHV_{iaddr}$ is indexed differently from the traditional GHV. Accordingly, the data processing system 110 implements two different types of GHVs, i.e., a traditional GHV and a new optimized $GHV_{iaddr}$.

The value in the GSEL may be employed to select between the LBHT and GBHT arrays for the direction of the prediction of each individual branch. BPU 204 also provides a branch target predictor, which is illustrated and discussed in further detail below with reference to FIG. 3.

The IFU 206 provides fetched instruction to instruction decode unit (IDU) 208 for decoding. IDU 208 provides decoded instructions to instruction dispatch unit 210 for dispatch. Following execution of dispatched instructions, instruction dispatch unit 210 provides the results of the executed dispatched instructions to completion unit 212. Depending on the type of instruction, a dispatched instruction is provided to branch issue queue 218, condition register (CR) issue queue 216, or unified issue queue 214 for execution in an appropriate execution unit. The branch issue queue 218 stores dispatched branch instructions for branch execution unit 220. CR issue queue 216 stores dispatched CR instructions for CR execution unit 222. Unified issued queue 214 stores instructions for floating point execution unit(s) 228, fixed point execution unit(s) 226, load/store execution unit(s) 224, among other execution units.

Figure 3:
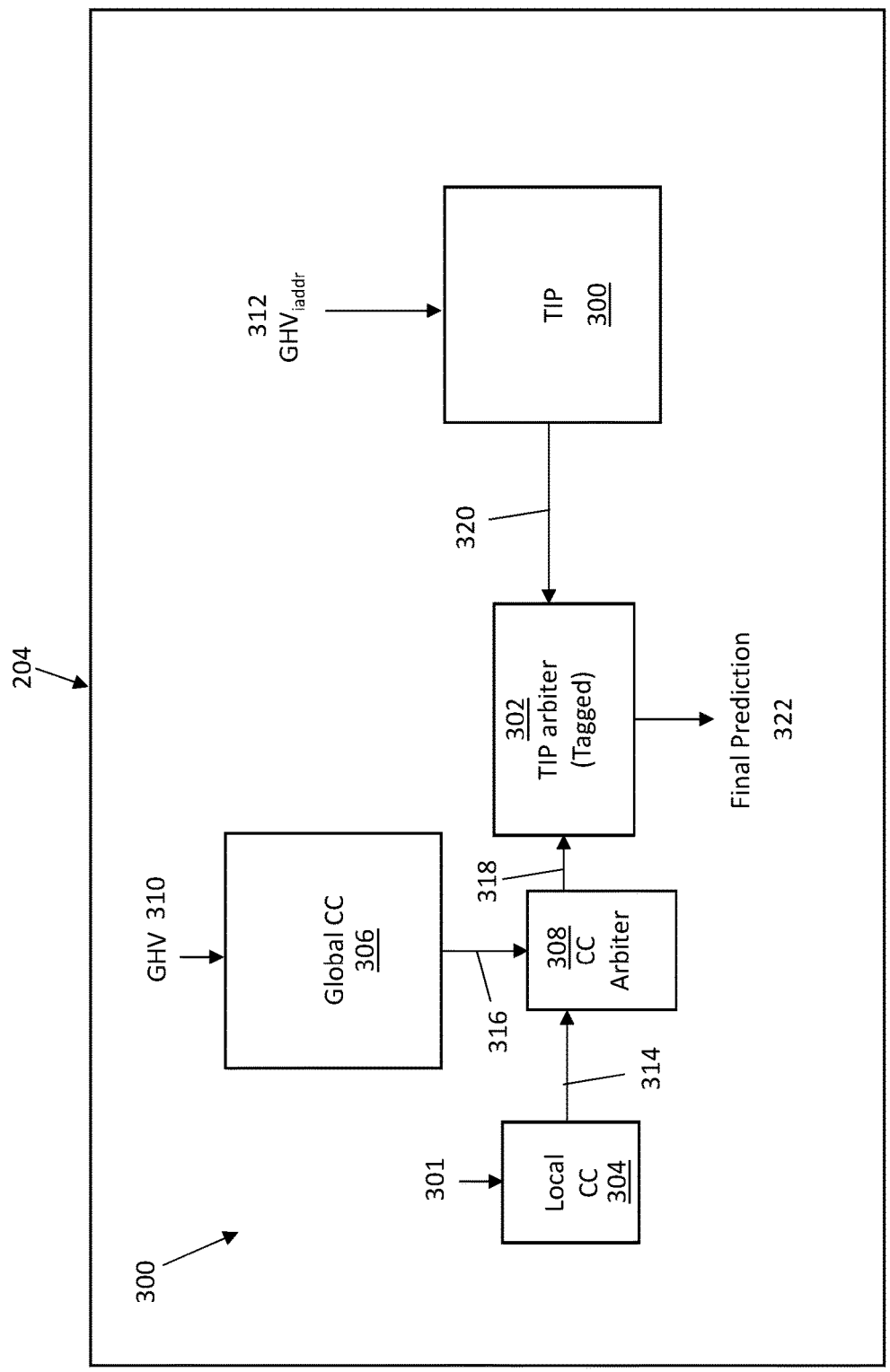
FIG. 3 is a block diagram of a branch prediction unit including a tagged indirect predictor (TIP) unit and TIP arbiter unit according to a non-limiting embodiment.

Referring now to FIG. 3, a BPU 204 including a TIP unit 300 and TIP arbiter 302 is illustrated according to a non-limiting embodiment. Along with TIP unit 300 and TIP arbiter 302, the BPU 204 includes a local count cache (LCC) 304, a global count cache (GCC) 306, and a count cache arbiter 308. In at least one embodiment, the local count cache (LCC) 304, the global count cache (GCC) 306, and the count cache arbiter 308 can serve as a first predictor circuit that generates a first predictor signal 318, while the TIP unit 300 can serve as a second predictor circuit that generates a second predictor signal 320, referred to herein as a TIP predictor 320. Any one of the TIP unit 300, the TIP arbiter 302, the local count cache (LCC) 304, the global count cache (GCC) 306, and the count cache arbiter 308 can be constructed as an electronic hardware controller that includes memory and a processor configured to execute algorithms and computer-readable program instructions stored in the memory.

The LCC 304 receives an instruction address (iaddr) 301. The instruction address 301 includes, an instruction fetch address register (IFAR) value. Accordingly, the LCC 304 can output a LCC prediction 314 indicating the next jump target based on the current process location in the source code independent from the branch instruction past behavior The GCC 306 receives a traditional GHV 310 that is exclusive OR'd (e.g., using an XOR gate not shown) with the value in the instruction address 301. Accordingly, the GCC 306 can output a GCC prediction output 316 that predicts the next target based upon based on the current process location in the source code along with a history of the number of taken/not taken branch results.

In various embodiments, the LCC 304 and the GCC 306 maintain respective confidence counts that are used (at least in part) to determine if respective entries in the LCC 304 and the GCC 306 should be replaced. The LCC 304 and the GCC 306 may, for example, each include two hundred fifty-six (256) entries. In the case that the LCC 304 and the GCC 306 each include two hundred fifty-six entries, eight bits are used to index one of the entries. In one or more embodiments, the confidence counts are maintained with respective up/down saturation counters (not shown) that are incremented when a count cache result is useful (i.e., correct) and are decremented when the count cache provides an incorrect target prediction. In at least one embodiment, when a new count cache entry (i.e., a new target) is added to the LCC 304 and/or the GCC 306, the corresponding confidence count is set to a value that allows for the target to be wrong at least once without being replaced immediately. In one or more embodiments, when the confidence count falls below some threshold and there is a target misprediction for a branch that indexed the entry, a new target is installed (in the entry with the target misprediction) in the LCC 304 and/or the GCC 306.

Figure 4:
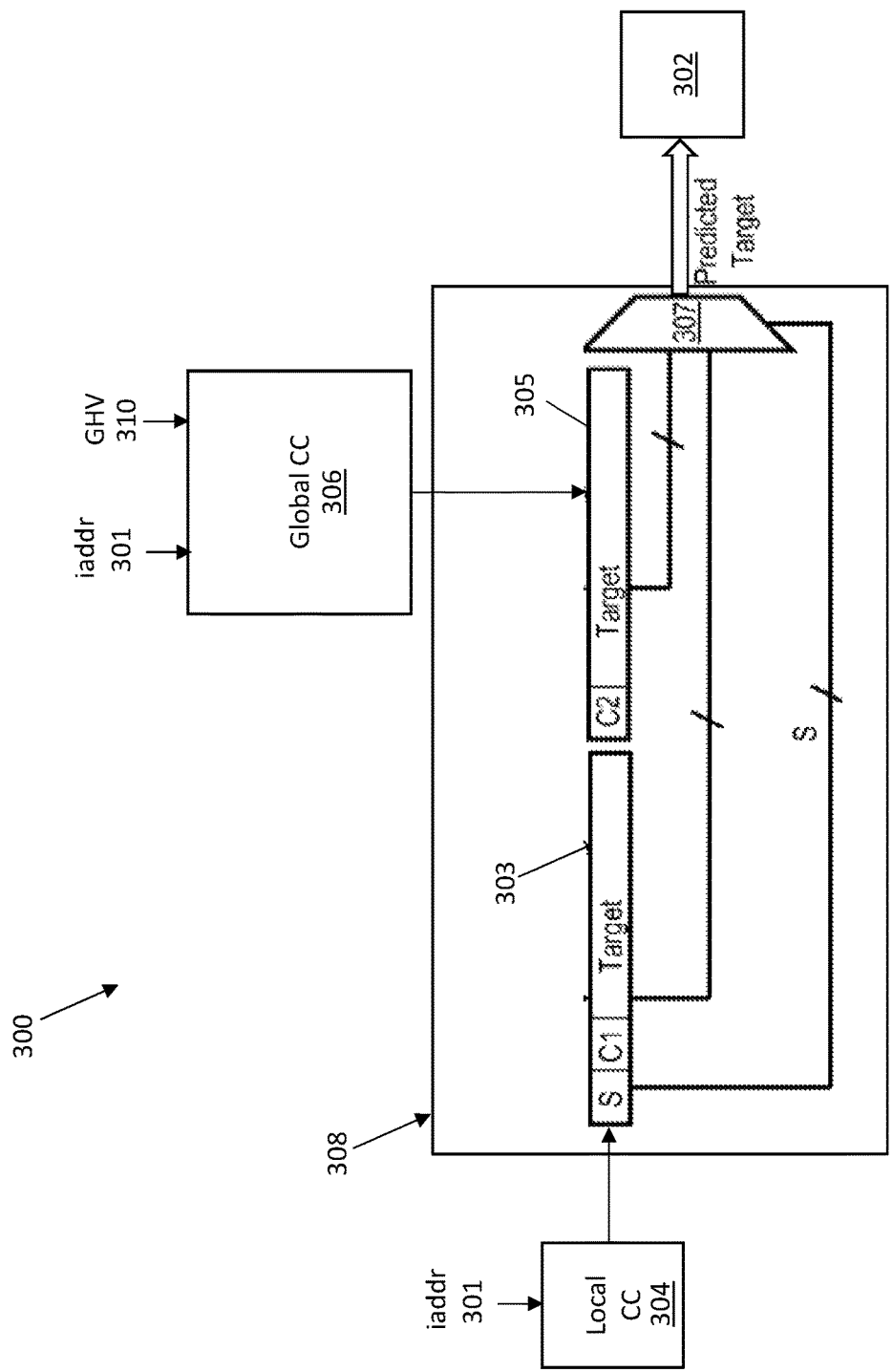
FIG. 4 illustrates a count cache (CC) arbiter according to a non-limiting embodiment.

Referring to FIG. 4 together with FIG. 3, the count cache arbiter 308 is illustrated according to a non-limiting embodiment. The count cache arbiter 308 is configured to select either the LCC prediction output 314 or the GCC prediction output 316. The selected prediction 318 is then subsequently utilized along with the TIP predictor 320 output from the TIP unit 300 to determine the final prediction 322 as described in greater detail below.

The count cache arbiter 308 includes a local count cache register 303, a global count cache register 305, and a multiplexer 307. The respective count cache (i.e., LCC 304 or GCC 306) that provides a target (e.g., the LCC predictor 314 or the GCC predictor 316) may also be selected based on an up/down counter (not shown). As is illustrated, a local count cache register 303 provides a first target (provided by LCC 304) to a first input of multiplexer 307 and a select signal (select signal 'S') to a select input of multiplexer 307. The global count cache register 305 provides a second target (provided by GCC 306) to a second input of multiplexer 307. Select signal 'S', which in the illustrated embodiment is generated from a selector bit in the entry of LCC 304 copied into local count cache register 303, selects whether a target provided by local count cache register 303 or a target provided by global count cache register 305 is provided at an output of multiplexer 307.

The selector bit may be updated if a predicted target is different for the count caches, and one of them is correct. For example, if the target predicted by LCC 304 is incorrect and a target predicted by GCC 306 is correct, the selector bit may be updated in the relevant entry of the LCC 304 to select the GCC 306 rather than the LCC 304 as the source of a subsequently predicted target. Similarly, if the target predicted by GCC 306 is incorrect and a target predicted by the LCC 304 is correct, the selector bit in the relevant entry of the LCC 304 may be updated to select the LCC 304 rather than the GCC 306 as the source of a subsequently predicted target. In one or more embodiments, if predicted targets from the LCC 304 and the GCC 306 are both correct or both incorrect the selector bit is not updated. In one or more embodiments, the update of an entry in the GCC 306 is suppressed when a target from the LCC 304 is selected and the confidence count of the LCC 304 is strong. Suppressing the update of the GCC 306 when a target from the LCC 304 is correct and the confidence count of the LCC 304 is strong generally reduces pollution of the GCC 306 for indirect branches that always go the same target.

Referring again to FIG. 3, the TIP unit 300 stores one or more entries. Each TIP entry has a TAG (hashed from the instruction address), a target prediction, and a confidence level. The TAG can be implemented as a hash of the instruction address (iaddr) and assists in identifying a given branch for prediction. In addition, each TIP entry is indexed based on the optimized $GHV_{iaddr}$ 312, which is different from the traditional predictor, i.e., GHV 310. The target prediction indicates the next jump point or location where the branch is predicted to jump to next. The confidence level is a measure indicating a likelihood that the TIP prediction 320 generated by the TIP unit 300 successfully predicts the next jump.

The TIP arbiter 302 operates in conjunction with the TIP unit 300 to select which predictor (i.e., either the selected predictor 318 output from the CC arbiter 308 or the TIP predictor 320 output from the TIP 300) shall be output as the final prediction 322. For example, the TIP arbiter 302 receives either the local CC prediction 314 or the global CC prediction 316 provided by the CC arbiter 308, along with the TIP predictor 320 provided by the TIP unit 300. The TIP arbiter 302 will output the TIP value as the final prediction in response to detecting a match between the fetched branch address and the TIP value. In other words, the TIP arbiter 302 can select the best "winner", and the TIP unit 300 may override the selected "winner" depending on the overall confidence of its entry.

In at least one embodiment, the TIP arbiter 302 includes an X bit counter (not shown), which saturates at value "Y". Accordingly, the TIP value is selected as the final prediction when the TIP arbiter counter is greater or equal to a count threshold ("Z") and an executed branch matches the corresponding entry tag in the TIP arbiter 302 matches the tag calculated from the current branch instruction address. That is, when the counter exceeds the count threshold "Z", the TIP arbiter determines the fetched branch instruction is more "loyal" to the TIP predictor 320. For example, the TIP arbiter 302 selects the TIP prediction 320 as the final target prediction when there is tag match in 302 and the counter value is greater than a threshold. The tag is based on bits of the instruction address (iaddr). Accordingly, the TIP arbiter 302 selects the TIP predictor 320 as the final prediction 322. On subsequent iterations, the TIP predictor 320 can be output as the final prediction 322 until the TIP predictor proves to be incorrect.

When the TIP predictor 320 is correct while the CC arbiter predictor 318 is incorrectly, the TIP arbiter counter can be decremented. When, however, the TIP predictor 320 is incorrect, while the CC arbiter predictor 318 is correct, the TIP arbiter counter can be decremented. When the count value falls below the count threshold, the TIP arbiter 302 determines the fetched branch instruction is more "loyal" to the CC arbiter predictor 318. In this scenario, the TIP arbiter 302 will select the CC arbiter predictor 318 (which is based on the local CC prediction 314 or global CC prediction 316) as the final prediction 322. The TIP arbiter 302 can continue to select the CC arbiter predictor 218 until the count value again exceeds the count threshold. If both predictors 318 and 320 are incorrect, the counter will not be incremented or decremented, and the previous predictor selection is maintained.

Figure 5:
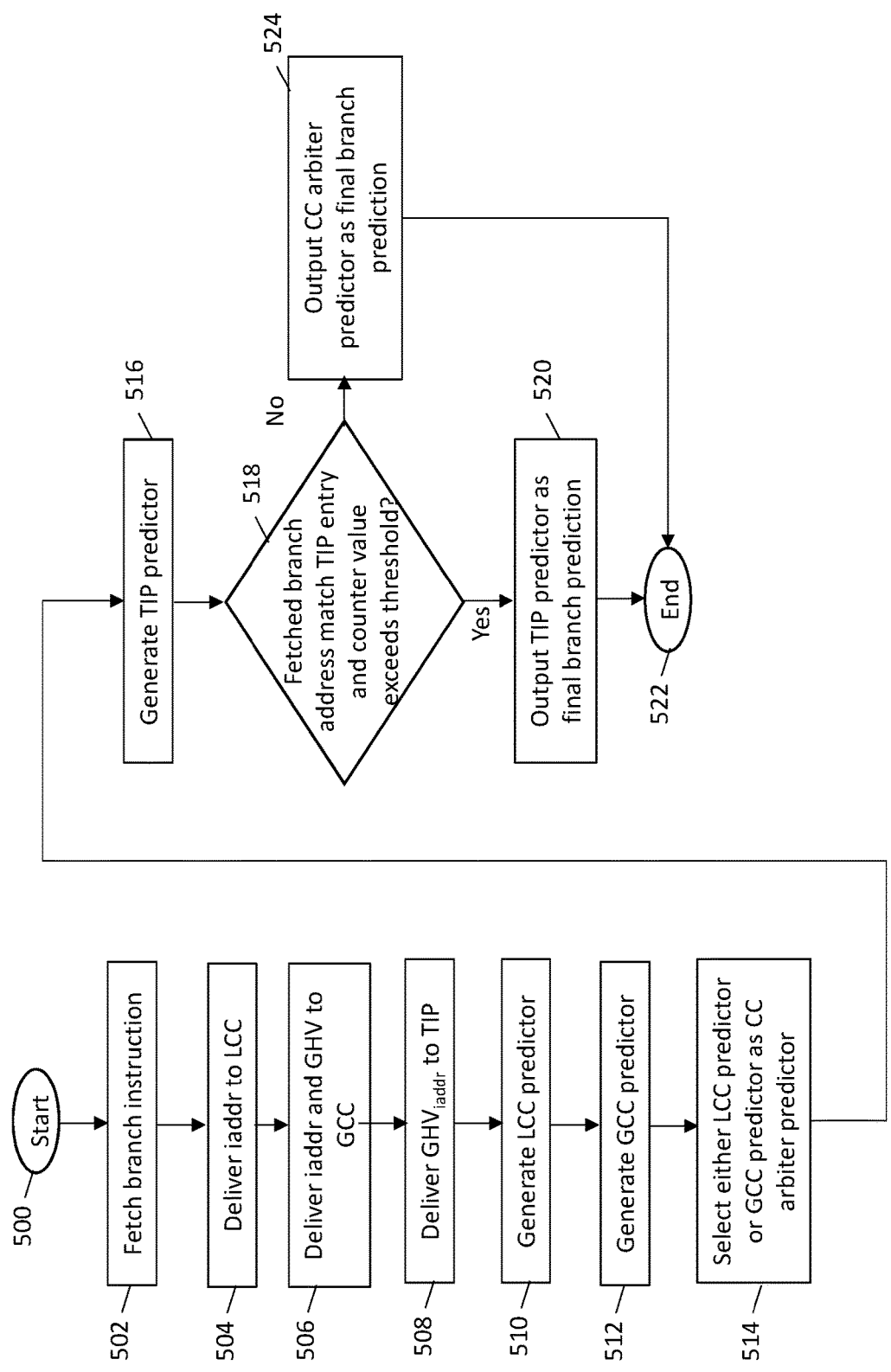
FIG. 5 is a flow diagram illustrating a method of performing tagged indirect branch predictions according to a non-limiting embodiment.

Turning now to FIG. 5, a method of performing a tagged indirect branch prediction is illustrated according to a non-limiting embodiment. The method begins at operation 500, and a branch instruction is fetched at operation 502. At operation 504, an instruction address (iaddr) of the fetched branch instruction is delivered to local count cache (LCC). At operation 506, a traditional global history vector (GHV) hash and the instruction address (iaddr) of the fetched branch instruction are delivered to a global count cache (GCC). At operation 508, an optimized global history vector ($GHV_{iaddr}$) is delivered to a tagged indirect predictor (TIP) unit.

At operation 510, a LCC predictor is generated, and at operation 512 a GCC predictor is generated. The LCC can be based on a target effective address (EA) of recently executed branch that indexes to the same entry in the LCC as the index calculated from the instruction fetch address register (IFAR) value, indicating the next jump target is based on the current process location in the source code independent from the branch instruction past behavior. The GCC predictor generated at operation 512 can be based on a traditional GHV, which is exclusive OR'd (e.g., using an XOR gate not shown) with the instruction address. Accordingly, the GCC prediction output predicts the next target based upon based on the current process location in the source code along with a history of the number of taken/not taken branch results. At operation 514, either the LCC predictor or the GCC predictor is selected and output as the CC arbiter predictor. At operation 516, a TIP predictor is generated by the TIP unit based on the $GHV_{iaddr}$ and the instruction address. In at least one embodiment, the TIP predictor is based at least in part on the target effective addresses (EA) of a history of recent jump targets, rather than a history of a previous number of taken/not taken branches.

At operation 518, a determination is made as to whether the fetched branch address matches the TIP entry of the fetched branch based on the tag match in the TIP arbiter. When a match occurs, and if the TIP arbiter counter value is greater than a preset threshold the TIP arbiter selects the TIP predictor and outputs it as the final prediction at operation 520, and the method ends at operation 522. When, however, a match does not occur, or if the TIP arbiter counter value is lower than the set threshold, the TIP arbiter selects the CC arbiter predictor and outputs it as the final prediction at operation 524, and the method ends at operation 522.

The present invention may be a system, a method, and/or a computer program product. The computer program product may include a computer readable storage medium (or media) having computer readable program instructions thereon for causing a processor to carry out aspects of the present invention.

As described herein, various non-limiting embodiments provide a computing system that improves performance, power consumption, and programming language processing by using a newly added arbiter unit to select between a traditional predictor and a newly employed predictor that is provided with different information from the traditional predictor. The newly employed predictor determines a final prediction of a target address of one or more branch instructions based at least in part on the target effective addresses (EA) of a history of recent jump targets, rather than a history of a previous history of taken/not taken branches.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
   a first predictor circuit configured to generate a first predictor signal;
   a second predictor circuit configured to generate a second predictor signal different from the first predictor signal;
   a Tagged Indirect Branch Predictor (TIP) arbiter configured to receive the first predictor signal and the second predictor signal, and to select one of the first predictor signal or the second predictor signal as a final prediction of a target address for a fetched branch instruction; and
   a TIP unit in signal communication with the TIP arbiter, the TIP unit configured to selectively override the final prediction determined by the TIP arbiter,
   wherein selecting one of the first predictor signal or the second predictor signal is based at least in part on a first comparison between a branch address of the fetched branch instruction and a stored tag value, along with a second comparison between a counter value stored in the TIP arbiter and a count threshold, the second comparison indicating a confidence level determined as a number of correctly and incorrectly supplied targets,
   wherein the TIP arbiter initially selects one of the first predictor signal and the second predictor signal as the final prediction of a target address for a fetched branch instruction, and
   wherein the TIP unit overrides the initial selection and commands the TIP arbiter to select the remaining signal among first predictor signal and the second predictor signal as the final prediction in response to the count value being less than the count threshold.

2. The computing system of claim 1, wherein the TIP arbiter selects the second predictor signal as the final prediction of a target address for the fetched branch instruction in response to detecting a match between the branch address of the fetched branch instruction and the stored tag, along with detecting that the stored counter value is greater than a threshold, and wherein the TIP arbiter selects the first predictor signal as the final prediction of a target address for the fetched branch instruction in response to detecting a mismatch between the branch address of the fetched branch instruction and the stored tag, or in response to detecting that the stored counter value is below a threshold.

3. The computer system of claim 2, wherein the first predictor signal is based at least in part on a number of previous taken or not taken branch results, and wherein the second predictor signal is based at least in part on addresses of previous jump targets independent from the previous taken or not taken branch results, and wherein the first and second predictor signals are generated by a predictor circuit.

4. The computer system of claim 3, wherein the first predictor signal is based at least in part on a current process location in a source code independent from past behavior of the fetched branch instruction and the second predictor signal is based at least in part on the current process location in the source code along with a history of the number of previous taken or not taken branch results.

5. The computer system of claim 3, wherein the TIP arbiter includes a TIP counter that is incremented in response to a match between the target address of the fetched branch instruction and the second predictor signal when there is mismatch between the target address of the fetched branch instruction and the first predictor signal, and decrements the TIP counter in response to a mismatch between the target address of the fetched branch instruction and the second predictor signal when there is a match between the target address of the fetched branch instruction and the first predictor signal.

6. The computer system of claim 5, wherein the TIP arbiter selects the second predictor signal when a count value of the TIP counter exceeds a TIP count threshold and selects the first predictor signal when the count value of the TIP counter does not exceed the TIP count threshold.

7. A method of performing tagged indirect branch predictions, the method comprising:
generating, via a first predictor circuit, a first predictor signal;
generating, via a second predictor circuit, a second predictor signal different from the first predictor signal; and
selecting, via a Tagged Indirect Branch Predictor (TIP) arbiter, one of the first predictor signal or the second predictor signal as a final prediction of a target address for a fetched branch instruction,
wherein selecting one of the first predictor signal or the second predictor signal is based at least in part on a first comparison between a branch address of the fetched branch instruction and a stored tag value, along with a second comparison between a counter value stored in the TIP arbiter and a count threshold, the second comparison indicating a confidence level determined as a number of correctly and incorrectly supplied targets,
wherein the TIP arbiter initially selects one of the first predictor signal and the second predictor signal as the final prediction of a target address for a fetched branch instruction, and
wherein the TIP unit overrides the initial selection and commands the TIP arbiter to select the remaining signal among first predictor signal and the second predictor signal as the final prediction in response to the count value being less than the count threshold.

8. The method of claim 7, further comprising:
selecting, via the TIP arbiter, the second predictor signal as the final prediction of a target address for the fetched branch instruction in response to detecting a match between the branch address of the fetched branch instruction and the stored tag, along with a detection that the stored counter value is greater than a threshold; and
selecting, via the TIP arbiter, the first predictor signal as the final prediction of a target address for the fetched branch instruction in response to detecting a mismatch between the branch address of the fetched branch instruction and the stored tag, or in response to the stored counter being below a threshold.

9. The method of claim 8, further comprising:
generating the first predictor signal based at least in part on a number of previous taken or not taken branch results; and
generating the second predictor signal based at least in part on addresses of previous jump targets independent from the previous taken or not taken branch results.

10. The method of claim 9, further comprising generating the first predictor signal based at least in part on a current process location in a source code independent from past behavior of the fetched branch instruction, and generating the second predictor signal is based at least in part on the current process location in the source code along with a history of the number of previous taken or not taken branch results.

11. The method of claim 9, further comprising:
incrementing a TIP counter in response to a match between the target address of the fetched branch instruction and the second predictor signal in response to a mismatch between the target address of the fetched branch instruction and the first predictor signal; and
decrementing the TIP counter in response to a mismatch between the target address of the fetched branch instruction and the second predictor signal in response to detecting a match between the target address of the fetched branch instruction and the first predictor signal.

12. The method of claim 11, further comprising:
selecting, via the TIP arbiter, the second predictor signal when a count value of the TIP counter exceeds a TIP count threshold; and
selecting, via the TIP arbiter, the first predictor signal when the count value of the TIP counter does not exceed the TIP count threshold.

13. A computer program product comprising a computer readable storage medium having program instructions embodied therewith the program instructions executable by a computer processor to cause the computer processor to perform a method of performing tagged indirect branch predictions, the method comprising:
generating, via a first predictor circuit, a first predictor signal;
generating, via a second predictor circuit, a second predictor signal different from the first predictor signal; and
selecting, via a Tagged Indirect Branch Predictor (TIP) arbiter, one of the first predictor signal or the second predictor signal as a final prediction of a target address for a fetched branch instruction,
wherein selecting one of the first predictor signal or the second predictor signal is based at least in part on a first comparison between a branch address of the fetched branch instruction and a stored tag value, along with a second comparison between a counter value stored in the TIP arbiter and a count threshold, the second comparison indicating a confidence level determined as a number of correctly and incorrectly supplied targets, and
wherein the TIP arbiter initially selects one of the first predictor signal and the second predictor signal as the final prediction of a target address for a fetched branch instruction, and
wherein the TIP unit overrides the initial selection and commands the TIP arbiter to select the remaining signal among first predictor signal and the second predictor signal as the final prediction in response to the count value being less than the count threshold.

14. The computer program product of claim 13, further comprising:
selecting, via the TIP arbiter, the second predictor signal as the final prediction of a target address for the fetched branch instruction in response to detecting a match between the branch address of the fetched branch instruction and the stored tag, along with a detection that the stored counter value is greater than a threshold; and
selecting, via the TIP arbiter, the first predictor signal as the final prediction of a target address for the fetched branch instruction in response to detecting a mismatch between the branch address of the fetched branch instruction and the stored tag, or in response to the stored counter being below a threshold.

15. The computer program product of claim 14, further comprising:
generating the first predictor signal based at least in part on addresses of previous taken or not taken branch results; and
generating the second predictor signal based at least in part on a number of previous jump targets independent from the previous taken or not taken branch results.

16. The computer program product of claim 15, further comprising generating the first predictor signal based at least in part on a current process location in a source code independent from past behavior of the fetched branch instruction, and generating the second predictor signal is based at least in part on the current process location in the source code along with a history of the number of previous taken or not taken branch results.

17. The computer program product of claim 15, further comprising:
incrementing a TIP counter in response to a match between the branch address of the fetched branch instruction and the second predictor signal in response to a mismatch between the target address of the fetched branch instruction and the first predictor signal;
decrementing the TIP counter in response to a mismatch between the branch address of the fetched branch instruction and the second predictor signal in response to detecting a match between the target address of the fetched branch instruction and the first predictor signal;
selecting, via the TIP arbiter, the second predictor signal when a count value of the TIP counter exceeds a TIP count threshold; and
selecting, via the TIP arbiter, the first predictor signal when the count value of the TIP counter does not exceed the TIP count threshold.

18. The method of claim 1, wherein selecting one of the first predictor signal or the second predictor signal as the final prediction of a target address for the fetched branch instruction further comprises:
initially selecting one of the first predictor signal or the second predictor signal as the initial predicted signal such that a non-selected signal among the first and second predictor signals is a non-initial predicted signal;
comparing, by the TIP unit, the count value to the counter threshold;
in response to the count value being greater or equal to the count threshold, confirming, by the TIP unit, the initial selection as the final prediction of the target address, and commanding the TIP arbiter to output the initial selection as the final prediction; and
in response to the count value being less than the count threshold, overriding, by the TIP unit, the initial selection, and commanding the TIP arbiter to output the remaining signal as the final prediction of the target address.

* * * * *